Patented Sept. 29, 1953

2,653,946

UNITED STATES PATENT OFFICE 2,653,946

PROCESS FOR PREPARING THE N-CARBOXYGLYCINE ANHYDRIDE

George A. Richardson, Dayton, Ohio, assignor to Monsanto Chemical Company, St. Louis, Mo., a corporation of Delaware No Drawing. Application June 23, 1950, Serial No. 170,052

4 Claims. (Cl. 260—307)

This invention relates to a method of preparing N-carboxy anhydrides of amino acids. More specifically the invention relates to a new and more economical process for preparing the N-carboxyglycine anhydride.

The N-carboxy anhydride of glycine has been prepared heretofore, but the methods used are tedious and not practicable in the industrial preparation of the compound. In the practice of the prior art the amino acid is first treated with an ester of chloroformic acid in an aqueous alkaline solution, thereafter the resulting product is extracted with ether, converted to the N-carboxy anhydride by reaction with thionyl chloride, and finally extracted from the reaction mixture with a suitable solvent. This procedure is complex and low yields of impure products are obtained.

The purpose of the present invention is to provide a more economical procedure for preparing N-carboxy anhydride of glycine. A further purpose is to provide a method of converting glycine into N-carboxyglycine anhydride.

It has now been found that the N-carboxy anhydride of glycine may readily be prepared by a simple direct procedure. The raw material used in the practice of this method is the glycine hydrochloride, which may be prepared from glycine by methods known to the art, for example treating the glycine with hydrochloric acid, while dispersed or dissolved in a suitable liquid medium. The hydrochloride of glycine is suspended in methyl ethyl ketone, in which it is insoluble. While so suspended it is reacted with phosgene, and as the reaction proceeds, the suspended hydrochloride is dissolved in the reaction medium. When the reaction is completed all or substantially all of the solid matter originally present in suspension will be in solution. The N-carboxyglycine anhydride may then be recovered from solution.

The use of methyl ethyl ketone is particularly adapted as a reaction medium because it is a good solvent for the N-carboxyglycine anhydride, but not for either glycine or glycine hydrochloride. Furthermore, the solubility of the anhydride in methyl ethyl ketone is such that substantial yields of the dissolved anhydride may be recovered by adding non-solvents, for example petroleum ether, hexane, ether, cyclohexane, chlorinated aliphatics or aromatics, such as chlorobenzene, chlorotoluene, tetrachlorethane.

The treatment of glycine hydrochloride in methyl ethyl ketone suspension is conducted with phosgene in gaseous state. Usually substantially atmospheric pressures are desirable. The reaction temperature of 40 to 65° C. has been found to be effective in the reaction, but optimum yields are produced with temperatures between 45 and 55° C. Operations below 40° C. are not desirable due to the reduced rate of reaction, whereas operations above 65° C. produce a high proportion of tar and other undesirable reaction products.

The N-carboxyglycine anhydride prepared in accordance with this improved method is of unusual purity and may be used in the preparation of protein resins or artificial proteins for food and medicinal uses.

Further details of this invention are set forth with respect to the following specific example.

Example

A mixture of 21 parts by weight of glycine hydrochloride and 101 parts of methyl ethyl ketone was charged to a glass reaction vessel provided with a stirring mechanism, a thermometer well, a reflux condensed sealed from atmospheric moisture by means of a drying tower and a gas inlet tube. The mixture was warmed to 50° C. and while vigorously stirring the reaction mass a steady stream of phosgene was passed through the vessel. The temperature was maintained between 45 and 52° C. and between 50 and 52° C. throughout the principal part of the reaction. After two hours and 45 minutes the slurry began to clear and after four hours the solution was essentially clear. The mixture was filtered while hot through a thoroughly dried filter apparatus, and the filtrate was thereafter maintained in as nearly an anhydrous atmosphere as possible. After cooling to room temperature a solid crystalline material was precipitated. The solid materials were separated by filtration, washed with dry hexane and stored in a vacuum desiccator. An equal volume of hexane was added to the filtrate and another crop of crystalline product was obtained. The combined product was dissolved in the least amount of methyl ethyl ketone and recrystallized by precipitation with one-half to one times the volume of dry hexane. The crystalline product so obtained in purified form was identified as N-carboxyglycine anhydride.

The invention is defined by the following claims:

1. A method of preparing N-carboxyglycine anhydride, which comprises dispersing glycine hydrochloride in methyl ethyl ketone, treating the dispersion with phosgene until a homogeneous solution is formed, and separating the resultant N-carboxyglycine anhydride by the addition of 2. A method of preparing N-carboxyglycine anhydride, which comprises dispersing glycine hydrochloride in methyl ethyl ketone, passing a stream of phosgene through the dispersion at 40 to 65° C. until the dispersion is converted into a solution, separating the N-carboxyglycine anhydride by adding an organic non-solvent miscible with methyl ethyl ketone.

3. A method of preparing N-carboxyglycine anhydride, which comprises dispersing glycine hydrochloride in methyl ethyl ketone, introducing phosgene at a temperature between 45 and 55° C., and separating the N-carboxyglycine anhydride by contacting the solution with an organic non-solvent miscible in methyl ethyl ketone.

4. A method of preparing N-carboxyglycine anhydride, which comprises dispersing glycine hydrochloride in methyl ethyl ketone, contacting the dispersion with phosgene at a temperature between 45 and 55° C., and separating the dissolved N-carboxyglycine anhydride by adding hexane.

GEORGE A. RICHARDSON.

References Cited in the file of this patent

Nature, January 28, 1950, p. 152.
Nature, April 22, 1950, p. 647.